United States Patent
Gupta et al.

(10) Patent No.: US 11,587,040 B2
(45) Date of Patent: Feb. 21, 2023

(54) SYSTEM AND METHOD FOR IDENTIFYING, ORDERING, AND CONTACTING CANDIDATES FOR A TARGET POSITION BASED ON A POSITION DETAIL PROFILE FOR THE TARGET POSITION

(71) Applicant: Zipstorm, Inc., Bellevue, WA (US)

(72) Inventors: Anoop Gupta, Bellevue, WA (US); Aravind Bala, Redmond, WA (US)

(73) Assignee: Zipstorm, Inc., Bellevue, WA (US)

(*) Notice: Subject to any disclaimer, the term of this patent is extended or adjusted under 35 U.S.C. 154(b) by 223 days.

(21) Appl. No.: 15/962,990

(22) Filed: Apr. 25, 2018

(65) Prior Publication Data

US 2020/0065769 A1 Feb. 27, 2020
US 2020/0272993 A9 Aug. 27, 2020

Related U.S. Application Data

(60) Provisional application No. 62/489,875, filed on Apr. 25, 2017.

(51) Int. Cl.
*G06Q 10/10* (2012.01)
*G06F 16/9035* (2019.01)
(Continued)

(52) U.S. Cl.
CPC ....... *G06Q 10/1053* (2013.01); *G06F 16/904* (2019.01); *G06F 16/906* (2019.01); *G06F 16/9035* (2019.01); *G06F 16/90332* (2019.01)

(58) Field of Classification Search
CPC .............. G06Q 10/105; G06Q 10/1053; Y10S 707/947; G06F 16/906; G06F 16/904; G06F 16/90332; G06F 16/9035
See application file for complete search history.

(56) References Cited

U.S. PATENT DOCUMENTS

2010/0114789 A1* 5/2010 Dane ............... G06Q 10/06
705/321
2012/0123956 A1* 5/2012 Chenthamarakshan ..............
G06Q 10/10
705/321

(Continued)

OTHER PUBLICATIONS

Matthew "How To Add Tab Sidebars To Google Chrome" TechJunkie, Apr. 13, 2016; available at: https://www.techjunkie.com/how-to-add-tab-sidebars-to-google-chrome/ (Year: 2016).*

(Continued)

*Primary Examiner* — Lynda Jasmin
*Assistant Examiner* — Brendan S O'Shea
(74) *Attorney, Agent, or Firm* — Rahman LLC

(57) ABSTRACT

The present disclosure provides a method for identifying, ordering, and contacting candidates for a target position based on a position detail profile for the target position. The method includes determining a position detail profile for the target position based on background details of users currently in a role corresponding to the target position, automatically determining a set of position-detail keywords for a search query to find one or more candidates for the target position, automatically prioritizing the set of position-detail keywords based on at least one of a frequency of occurrence of the keywords in the background details of the users currently to obtain a prioritized set of keywords, executing a search query based on the prioritized set of keywords to obtain a candidate list, determining a compatibility score between candidates in the candidate list, ordering the candidate list based on the compatibility scores of candidates.

9 Claims, 16 Drawing Sheets

(51) Int. Cl.
*G06F 16/9032* (2019.01)
*G06F 16/904* (2019.01)
*G06F 16/906* (2019.01)
*G06Q 10/1053* (2023.01)

(56) References Cited

U.S. PATENT DOCUMENTS

| | | | | |
|---|---|---|---|---|
| 2014/0074738 A1* | 3/2014 | Thankappan | ...... | G06Q 10/1053 705/321 |
| 2014/0122355 A1* | 5/2014 | Hardtke | ............... | G06Q 10/105 705/321 |
| 2017/0344954 A1* | 11/2017 | Xu | ......................... | G06F 16/248 |
| 2018/0173804 A1* | 6/2018 | Kenthapadi | ............ | G06N 20/00 |

OTHER PUBLICATIONS

"What is a Boolean Operator" Alliant Libraries, as archived May 31, 2010; available at: https://web.archive.org/web/20100531205434/https://library.alliant.edu/screens/boolean.pdf (Year: 2010).*

Shaha T. Al-Otaibi, and Ykhlef Mourad. "A survey of job recommender systems." International Journal of Physical Sciences 7.29 (2012): 5127-5142. (Year: 2012).*

Marston, Timothy "A Recruiter's Guide to Boolean Searching (and the World's Largest Free CV Database)" ERE.net Oct. 6, 2009; avilable at: https://www.ere.net/a-recruiters-guide-to-boolean-searching-and-the-worlds-largest-free-cv-database/ (Year: 2009).*

* cited by examiner

| | Inbox (5) | Career Insights | Featured Users | Blog | John Smith ∨ |
|---|---|---|---|---|---|

NEXT STEPS BY LOCATION

COMPANIES THAT HIRE FOR A TITLE IN A SPECIFIC LOCATION

| FINANCIAL ANALYST | NEW YORK CITY | UPDATE |
|---|---|---|

FILTERS | SEARCH IN RESULTS | SALARY RANGE ∨ COMPANY SIZE ∨ NUMBER OF POSITIONS ∨ INDUSTRY ∨

APPLIED FILTERS:

WE HAVE FOUND 2052 COMPANIES

| ⇅ | COMPANY | TITLE | TITLE COUNTS | COMPANY SIZE | SALARY |
|---|---|---|---|---|---|
| 1 | IBM | FINANCIAL ANALYST | | | $76K |
| 2 | GOLDMAN SACHS | FINANCIAL ANALYST | | | $85K |
| 3 | NYU LANGONE MEDICAL CENTER | FINANCIAL ANALYST | | | $77K |
| 4 | THE BLACKSTONE GROUP | FINANCIAL ANALYST | | | $82K |
| 5 | WELLS FARGO | FINANCIAL ANALYST | | | $74k |

FIG. 3

Position Overview

Explore backgrounds, skills, and job history of people in a specific position

| Goodwin Procter LLP ▼ | Associate ✕ | | Update |

Associate @ Goodwin Procter LLP

Company Info

Goodwin Procter LLP is the 35th wealthiest American law firm, consisting of more than 900 lawyers with offices in Boston, Frankfurt, Hong Kong, London, Los Angeles, New York City, Paris, Silicon Valley, san Francisco, and Washington, D.C. Goodwin focuses on complex transactional work and high stakes litigation in matters involving financial institutions, intellectual property, private equity, real estate capital markets, securities litigations/white collar defence, and technology/life sciences.

Salary for Associate at Goodwin Procter LLP:
Min: $160K, Median: $185K, Max: $230K, Your Compatibility Score

| 76% | Your background is a strong match with this position |

Improve your chance of landing this position with these 3 steps

People
Search for people in the position associate @ Goodwin Procter LLP
In your Professional network contacts
Across all of Networks

Job Listing
Jobs by Indeed

Career Path

Before...
  Summer Associate
  At Goodwin Procter LLP
  Associate
  At Latham & Watkins After...
  Partner
  At Goodwin Procter LLP
  Of Counsel
  At Goodwin Procter LLP

Education & Training

Skills — See all
Litigations
Legal Research
Legal Writing
Intellectual Property
Private Equity Years of Experience — See all
Longest : 14 Years
Average : 4.1 Years Schools — See all
Boston College Law School
Boston University School of Law
Georgetown University Law Center
Fordham University School of Law
Harvard Law School Majors — See all
Law
Political Science
Chemistry
Cum Laude
History Certifications — See all
Massachusetts Bar
New York State Bar
Registered Patent Attorney
Licensed Attorney
Certified Information Privacy

FIG. 4A

Position Overview

Explore backgrounds, skills, and job history of people in a specific position

| USPTO | ▶ | Primary Patent Examiner ✕ | | Update |

Primary Patent Examiner @ USPTO

Company Info

Average salary for primary patent examiner at USPTO: $125k

Learn More:

Your Compatibility Score

| 85% | Your background is a strong match with this position | Improve your chance of landing this position with these 3 steps |

People

Search for people in the position primary examiner @ USPTO

In your Professional network contacts

Across all of Networks

Job Listing

Jobs by Indeed

Career Path

Before...
   Patent Examiner
     At USPTO
   Other
     At USPTO
   Assistant Patent Examiner
     At USPTO After...
   Supervisory Patent Examiner
     At USPTO
   Patent Attorney
     At USPTO
   Associate
     At Ropes & Gray LLP

---

Education & Training

Skills     See all

Patents
Patent Application
Patent Prosecution
Intellectual Property
Patent Searching

Years of Experience     See all
Longest : 23 Years
Average : 7.7 Years

Schools     See all
Penn State University
North Carolina State University
University of Maryland College Park
University of Illinois at Urbana-Champaign
George Mason University

Majors     See all
Electrical Engineering
Mechanical Engineering
Law
Chemical Engineering
Computer Engineering

Certifications     See all
Attorney

< Dashboard

FIG. 4B

< Position Overview

| Google ▶ | Schools |
| Software Engineer ✕ | Update |

Search

Frequency
☐ More Common
☐ Less Common
☐ Rare

University of Florida  
University of California, Santa Barbara  
National Taiwan University  
Harvey Mudd College  
University of Waterloo  
The University of Texas at Austin  
Yale University  
Stony Brook University  
Harvard University  
Penn State University  
University of California, Los Angels  
Columbia University in the city of New York  
Columbia University  
University of Utah  
Massachusetts Institute of Techniology  
Peking University  
Fudan University  
Shanghai jiao Tong University  
University of Maryland college Park  
University of Illinois at Urbana - Champaign  
University of Michigan  
Stanford University  
Indian Institute of Technology, Bombay  
University of Washington  
National Taiwan University

FIG. 6

| | Inbox (5) | Career Insights | Featured Users | Blog | John Smith > |

Alumni Next Steps by Location
Companies that hire alumni in a specific location

| Carnegie Mellon University ▶ | Computer Science ▶ | Bachelors degree ▶ | New York City | UPDATE |

| Filters | Search in results | Company Size ⌄ | Industry ⌄ | |

Applied Filters:

We've found 96 Companies.

| ⇅ | Company | Alumni Count | Company Size |
|---|---------|--------------|--------------|
| 1 | Google | | |
| 2 | Yext | | |
| 3 | Bloomberg LP | | |
| 4 | Amazon | | |
| 5 | Facebook | | |

FIG. 7

Enter the company and title(s) for the positions you are trying to hire for.

Compan y: AMAZON

Title: enter as many as you want: Software Development Engineer ("Greater Seattle Area") And (HTML OR JavaScript OR MySQL OR Python OR PHP) AND ("Tata Consultancy Services" OR Infosys OR Microsoft) AND ("Systems Engineer" OR "Software Development Engineer") 902

[Copy to Clipboard] [Save]
Open in:
[LinkedIn] [LinkedIn on Google] [Bing]

[Sort keywords by relevance] OR [Sort keywords alphabetically]

☑ Locations

Currently searching by location does not work on Google and Bing. (coming in near future.) Select from small set of locations below for correct search on LinkedIn. You can also filter by location directly on the LinkedIn query page – select on the left pane.

☑ Greater Seattle Area 904A  ☐ San Francisco Bay Area  ☐ Greater Los Angeles Area  ☐ Greater San Diego Area ☑ Skills (Frequency: very common, common, uncommon, rare, very rare)     Created new skills block as "AND" term: ⊞

Search ☐

☐ Java ☐ C ☐ C++ ☐ CSS ☑ Java Script 904B ▲ ☑ Python ☐ SQL ☐ Linux ☐ Programming ☑ MySQL ☐ C#
☐ Data Structures ☐ CSS ☐ jQuery ☐ XML ☐ Perl ☐ IBM ☐ Matlab ☐ Andriod    Show More...

☑ Companies (Frequency: very common, common, uncommon, rare, very rare)

Search ☐

☑ Microsoft ☑ Tata Consultancy Services ☑ Infosys ☐ ACCENTURE ☐ Oracle ☐ JPMorgan Chase
☐ Northrop Grumman Corporation ☐ Aricent ☐ CSC ☐ Freelance ☐ CGI ☐ Adobe    Show More ☑ Titles (Frequency: very common, common, uncommon, rare, very rare)

Search ☐

Excluded terms for titles
906

☐ Recruiter  ☐ Recruiting  ☐ Staffing  ☐ Recruitment  ☐ Lead  ☐ Manager  ☐ Mgr  ☐ Director  ☐ Dir
☐ Vice president  ☐ VP Years of experience 908
Searching by location does not work on Google and Bing ☐ Less than 1 year  ☐ 1 to 2 Years  ☐ 3 to 5 Years  ☐ 6 to 10 Years  ☐ More than 10 years ☐ Schools (Frequency: very common, common, Uncommon, Rare, Very Rare)

☐ Majors (Frequency: very common, common, Uncommon, Rare, Very Rare)

☐ Degrees (Frequency: very common, common, Uncommon, Rare, Very Rare)

☐ Certifications (Frequency: very common, common, Uncommon, Rare, Very Rare)

SYSTEM AND METHOD FOR IDENTIFYING, ORDERING, AND CONTACTING CANDIDATES FOR A TARGET POSITION BASED ON A POSITION DETAIL PROFILE FOR THE TARGET POSITION

BACKGROUND

Technical Field

The embodiments herein generally relate to big data analytics and machine learning applied to the field of identifying, ordering and contacting candidates, and more particularly to a system and method for identifying, ordering, and contacting candidates for a target position based on a position detail profile for the target position.

Description of the Related Art

Recruitment is a key challenge for most organizations. The skills and qualifications required to perform various roles successfully keep changing, and recruiters have to keep adapting to identify the best people for the roles. Recruiters often lack the domain expertise to identify the most relevant candidates, particularly for technical or domain specific roles. Moreover, the volume of potential candidates from job websites, people databases, search engines, professional networking websites is too high for recruiters to narrow down to the most suitable candidates within a limited time frame within which an open position has to be filled. Hence, it's difficult to identify candidates with appropriate capabilities to fill a vacancy in an organization in a timely manner. Research indicates that some of the professionals who are most suitable for a role are passive seekers unless they are approached and finding the appropriate individuals and contacting them is a challenging task.

Accordingly, there remains a need for a system and method for identifying, ordering, and contacting candidates for a target position.

SUMMARY

In view of the foregoing, an embodiment herein provides one or more non-transitory computer readable storage mediums storing one or more sequences of instructions, which when executed by one or more processors enables identifying, ordering, and contacting candidates for a target position based on a position detail profile for the target position. The steps includes determining a position detail profile for the target position based on background details of users currently in a role corresponding to the target position and the background details comprise previous positions, skills, and educational background, automatically determining a set of position-detail keywords for a search query to find one or more candidates for the target position based on the position detail profile for the target position, automatically prioritizing the set of position-detail keywords based on at least one of a frequency of occurrence of the keywords in the background details of the users currently in the role corresponding to the target position to obtain a prioritized set of keywords, executing a search query based on the prioritized set of keywords, on one or more (a) people databases or (b) search engines based on APIs or a query syntax of the search engines, to obtain a candidate list, determining a compatibility score between candidates in the candidate list returned from the people database or the search engine, and the position detail profile of the target position using machine learning or a statistical technique and the compatibility score is determined by comparing previous positions, skills, and educational background of the candidates with the background details of users currently in a role corresponding to the target position, ordering the candidate list based on the compatibility scores of candidates in the candidate lists to obtain an ordered candidate list that is ordered based on compatibility scores, and providing a communication interface to enable the recruiter to communicate with candidates in the ordered candidate list.

In one aspect, a system for identifying, ordering, and contacting candidates for a target position based on a position detail profile for the target position is disclosed. The system includes a device processor and a non-transitory computer readable storage medium comprising one or more modules executable by the device processor. The one or more modules includes a position detail profile generation module, a keyword generation module, a keyword prioritization module, a query execution module, a position compatibility module, a candidate ordering module, and a message generation module.

The position detail profile generation module determines a position detail profile for the target position based on background details of users currently in a role corresponding to the target position, wherein the background details comprise previous positions, skills, and educational background. The keyword generation module automatically determines a set of position-detail keywords for a search query to find one or more candidates for the target position based on the position detail profile for the target position. The keyword prioritization module automatically prioritizes the set of position-detail keywords based on at least a frequency of occurrence of the position-detail keywords in the background details of the users currently in the role corresponding to the target position to obtain a prioritized set of keywords.

The query execution module executes a search query based on the prioritized set of job description keywords on one or more (a) people databases or (b) search engines based on APIs or a query syntax of the search engines, to obtain a candidate list. The position compatibility module determines a compatibility score between candidates in the candidate list returned from the people database or the search engine, and the position detail profile of the target position using machine learning or a statistical technique, wherein the compatibility score is determined by comparing previous positions, skills, and educational background of the candidates with the background details of users currently in a role corresponding to the target position. The candidate ordering module orders the candidate list based on the compatibility scores of candidates in the candidate lists to obtain an ordered candidate list that is ordered based on compatibility scores. The message generation module provides a communication interface to enable the recruiter to communicate with candidates in the ordered candidate list. The filter generation module that automatically determines filters based on the position detail profile to find candidates for the target position.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 illustrates a user interface view of an opportunity map specific to a location where companies hire for a specific title according to an embodiment herein;

FIGS. 4A and 4B illustrate user interface views of opportunity maps that provide position details for specific positions to recruiters according to an embodiment herein;

FIG. 6 illustrates a user interface view of map of schools that illustrates a plurality of schools attended by a plurality of candidates who are currently working in the selected position according to an embodiment herein;

FIG. 7 illustrates a user interface view of an opportunity map specific to companies that hires alumni in a specific location according to an embodiment herein;

FIGS. 9A and 9B illustrates user interface views of a query builder for recruiters according to an embodiment herein;

FIG. 10 illustrates user interface view of a boolean query builder browser extension according to an embodiment herein;

DETAILED DESCRIPTION OF PREFERRED EMBODIMENTS

Figure 1:
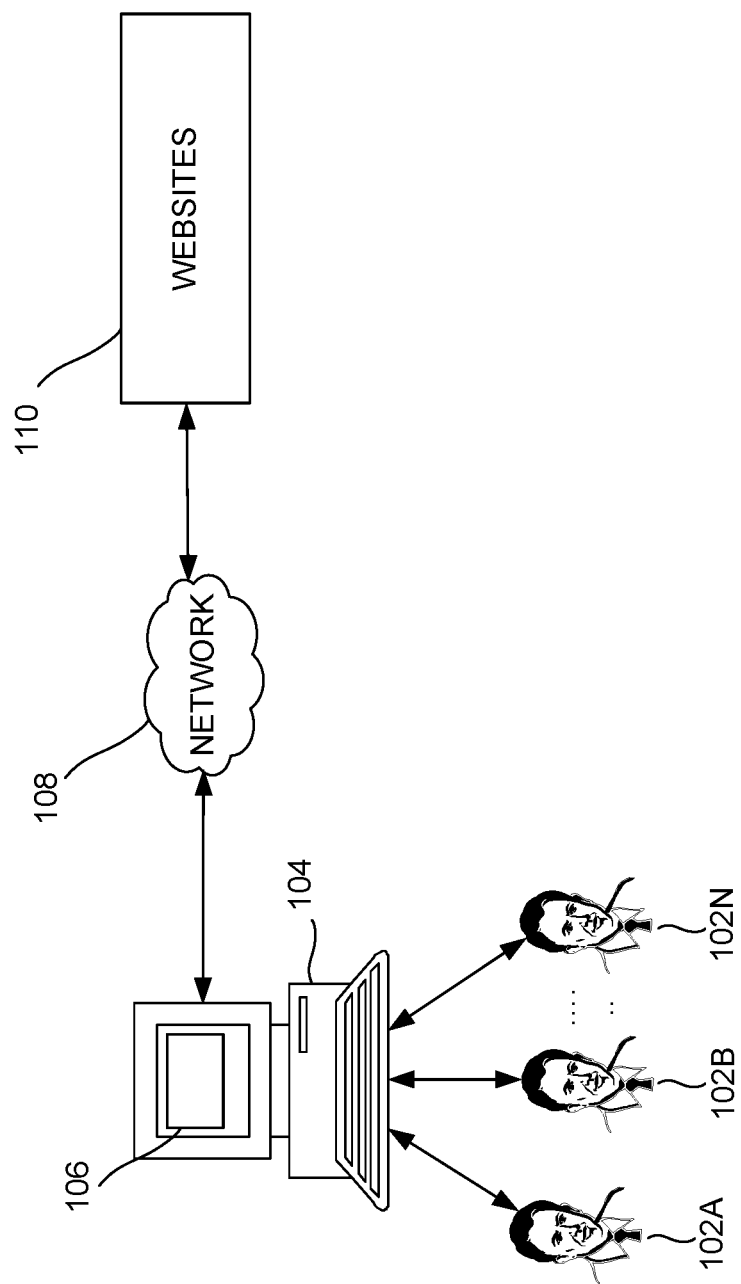
FIG. 1 illustrates a recruiter system that obtains entity information from a plurality of users and websites to generate a candidate list for recruiters according to an embodiment herein.

The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Descriptions of well-known components and processing techniques are omitted so as to not unnecessarily obscure the embodiments herein.

The present disclosure provides one or more non-transitory computer readable storage mediums storing one or more sequences of instructions, which when executed by one or more processors enables identifying, ordering, and contacting candidates for a target position based on a position detail profile for the target position, by performing the steps of:

determining a position detail profile for the target position based on background details of users currently in a role corresponding to the target position, wherein the background details comprise previous positions, skills, and educational background;

automatically determining a set of position-detail keywords for a search query to find one or more candidates for the target position based on the position detail profile for the target position;

automatically prioritizing the set of position-detail keywords based on at least one of a frequency of occurrence of the keywords in the background details of the users currently in the role corresponding to the target position to obtain a prioritized set of keywords;

executing a search query based on the prioritized set of keywords, on one or more (a) people databases or (b) search engines based on APIs or a query syntax of the search engines, to obtain a candidate list;

determining a compatibility score between candidates in the candidate list returned from the people database or the search engine, and the position detail profile of the target position using machine learning or a statistical technique, wherein the compatibility score is determined by comparing previous positions, skills, and educational background of the candidates with the background details of users currently in a role corresponding to the target position;

ordering the candidate list based on the compatibility scores of candidates in the candidate lists to obtain an ordered candidate list that is ordered based on compatibility scores; and providing a communication interface to enable the recruiter to communicate with candidates in the ordered candidate list.

In one embodiment, the method further includes the steps of: constructing a boolean query on a boolean query interface; and automatically determining filters based on the position detail profile to find candidates for the target position, wherein the filters are based on the background details.

In another embodiment, the method further includes the steps of: prioritizing a set of filter properties that are shown in the Boolean query interface based on at least a frequency of occurrence of properties in the background details of the users currently in the role corresponding to the target position, wherein the filter properties comprise frequently occurring values of background details associated with the filter in the position detail profile of the target position. The boolean query is constructed on the boolean query interface based on positive keywords, pre-established negative keywords that are independent of the position detail profile, and the filters separated by boolean operators, wherein the negative keywords are used to exclude candidates associated with the negative keywords from appearing in the candidate list.

In yet another embodiment, the method further includes the step of assigning weights to each of the prioritized keywords; wherein the boolean query is executed based on the prioritized set of keywords and the weights assigned to each of the prioritized keywords on the one or more (a)

people databases or (b) search engines based on APIs or a query syntax of the search engines, to obtain the candidate list.

In yet another embodiment, the method further includes the steps of: parsing a job-description to identify additional job-description keywords for the target position, enriching the search query that comprises the set of keywords obtained from the position detail profile by augmenting it with the additional job-description keywords obtained from analysis of the job-description, and computing an intelligent match based on weightages allocated to the set of position-detail keywords and the additional job-description keywords.

In yet another embodiment, determining areas of match and areas of mismatch between a candidate from the candidate list and the target position to generate a compatibility report; and displaying the compatibility score and the compatibility report of the candidate for the target position within a browser extension as a side-bar while browsing a profile of the candidate to enable making a quick decision on the candidate.

In yet another embodiment, the communication interface to automatically generate a draft message to a candidate, wherein the message comprises an indication (i) that the candidate is a good match for the target position, (ii) and why the candidate is a good match for the target position.

In yet another embodiment, the entity information includes at least one of (a) position details, (b) job openings, (c) skills required for the job, (d) schools attended by the users, (e) majors and degrees studied by the users, (f) locations of the users, or (g) background details of the user. In yet another embodiment, the entity information of the users is extracted from at least one of (a) one or more job websites, (b) information that is entered by the recruiter in the recruiter system, (c) job information directly imported by the recruiter into the recruiter system, or (d) job information obtained from one or more websites.

In yet another embodiment, the filters includes automatic filter properties that filters pre-established negative keywords that are independent of the position detail profile and the negative keywords are used to exclude candidates associated with the negative keywords from appearing in the candidate list.

The present disclosure also provides for identifying, ordering, and contacting candidates for a target position based on a position detail profile for the target position. The embodiments herein disclose a recruiter system for recruiters to provide visibility to the comprehensive landscape of relevant candidates for a given target position based o the candidates background such as previous positions, skills, and educational background.

In one embodiment, a user experience (UX) of the recruiter system may include a collection of filters for the opportunity map, which may be dynamically generated. For example, the filters are dynamically generated as follows: (i) for next positions opportunity map, the opportunity network system first generates all feasible next positions (e.g. possible subsequent positions) based on transitions that real people have made previously. Once the next positions (e.g. possible subsequent positions) are generated, the opportunity network system may determine the industry that the resulting companies belongs to. The filters are generated only for those companies. For example, if there was no companies belong to healthcare industry, the recruiter system does not generate the filters that allow the recruiter to select healthcare as an industry.

The collection of filters may allow the recruiter to filter the nodes in the opportunity map to highlight different kinds of relevant opportunities based position details (e.g. filter by companies in a certain industry, only show roles which have a higher median salary than the current salary, or startup companies that have fewer than 50 employees, and so on).

A Compatibility Score and Report: One embodiment herein discloses an opportunity network system for professionals and students that provide a compatibility score and/or a compatibility report as a basis for informing the user about degree/extent of match between their background/resume and any position in the opportunity map. The recruiters may provide information about the background details manually, or by importing the resume as a PDF file or importing by connecting to a profile on a job or professional networking websites etc. The recruiter system may parse the candidates resume to understand his/her top skills, experience (e.g. years of experience, previous companies etc.) and educational background.

According to one embodiment, the compatibility report leverages machine learning and statistical techniques to compute a degree of match between a candidate profile and a position-detail profile. For example, the compatibility report may inform the recruiter that the candidate profile satisfies 4 skills out of the top 10 skills mentioned for a position at USPTO and notify the recruiter about the remaining 6 skills that are missing. In an embodiment.

The compatibility score may be a single number or a percentage summary (e.g. 69% match) or text/word representing the qualitative degree of match (e.g. great, good, neutral, stretch, poor) for the position based on the overall compatibility report details. In addition, the compatibility score could include explanations on the various parts that contributed to the score, such as skills, schools, previous positions, years of experience etc.

The compatibility score and report may be further refined for greater value if the recruiter provides a specific candidate. In that case, the recruiter system (a) first parses the job-description (JD) and extracts the meaningful entities and keywords from the job description (b) merges the appropriate weights with the position requirements obtained from the position-detail, and (c) an intelligent match based on weightages allocated to the set of position-detail keywords and the additional job-description keywords.

The recruiter system may provide a filter to the candidates to dynamically filter the possible subsequent positions shown in the opportunity map based on a degree of match. The compatibility score (CS) and the compatibility report (CR) may not be limited to perform matching simply on the basis of an exact match (e.g. a user went to Stanford University and the person detail profile says that research scientists at Microsoft® often come from Stanford). For example, the recruiter system may derive that Stanford is a top-tier research university and so is Massachusetts Institute of Technology (MIT) and both may be considered equivalent for matching purposes. Similarly, the recruiter system may include many intelligent algorithms to identify the equivalence between skills, certifications, companies etc. so that an "intelligent-matching" is used wherever feasible rather than relying on "exact matching". The recruiter system may use various techniques including natural language parsing techniques, domain dictionaries like Wikipedia and web search to determine equivalences of different entities. Some of the information could also be human authored, such as a list of top tier universities.

In an embodiment, the compatibility score measures the match between a candidate's resume and the possible subsequent position. The compatibility score is calculated for different sections (e.g. skills, certifications, positions, education, location, years of experience, and salary), and are combined for an overall score. For each section, the recruiter system may look at (a) matches between the candidate and the top feature for all the candidates who are currently in that particular position (e.g. a skill that the candidate has can be one of the top skills for that position, (b) top missing features (e.g. skills, certifications, etc.) from the candidates resume but the candidate who are currently in that position have that features, and (c) there are common between the candidates resume and the target profile, but that are not very important to the target position. In one embodiment, identification of top missing skills can be used to improve the resume.

The recruiter system provides an easy way for recruiters to generate Boolean queries to search relevant candidates on LinkedIn®, Google®, Bing®, and other custom people databases and search engines. In one embodiment, the recruiter system may provide a Boolean query generation module to generate the Boolean queries. This is based on the insight that for an open role, a prospective recruiter would want to find people who have backgrounds that are similar to those of the people who are currently in that role.

The recruiter system may obtain a current open position (e.g. company and title) from the recruiter that he/she is trying to fill. The recruiter system may automatically determine the potential/candidate-set of keywords to be used in building the search query based on background details of candidates currently in the role corresponding to the open position. The keywords spanning all aspects of the background details. For example, but not limited to: skills, certifications, years-of-experience, past positions (e.g. companies, titles) from which folks joined the current role, past educational background (e.g. schools, majors, degrees) from which people (e.g. users) joined this role, salary information. The keywords are prioritized in the keyword prioritization module interface based on either frequency of occurrence of the keywords, or the market-value of the keywords, or a combination of both.

The Boolean query generation module may provide a simple interface that allows the recruiter/hiring-manager to select keywords that they wish to actually include in the search query (e.g. a subset of the background skills is important for the search query). In one embodiment, the Boolean query builder tool interface allows the recruiter to add custom keywords that were not automatically suggested by the built-in algorithm. In another embodiment, the Boolean query generation module interface not only allows to select positive keywords (e.g. those should be present in candidate's resume), but also allows to select negative keywords (e.g. those should be missing, e.g. the words recruiter, or staffing, or vice-president in the title). In yet another embodiment, the Boolean query generation module interface shows the constructed Boolean-Query in the interface to the recruiters to select various positive/negative keywords. In yet another embodiment, the Boolean query generation module allows the recruiter to save and retrieve and modify previously-saved queries to generate new queries.

The Boolean query generation module intelligently converts the search query into an actual query to be executed against variety of people-databases (e.g. LinkedIn®, Google search, Bing-search, commonly-used applicant-tracking-databases by companies, and so on). The Boolean query generation module may run the search queries against the people-databases to provide viable candidates to the recruiter/hiring-manager.

The Boolean query generation module may identify the different keywords for (a) locations based on top locations for a particular position, (b) skills based on skills of the users who are currently working in the particular position. The Boolean query generation module considers the frequency of each skill (e.g. how often it occurs). The final keyword list for skills is put together based on a variety of criteria as follows: (i) Common skills, (ii) skills that are common for that particular position, but are uncommon for the title (e.g. skills common to software engineers at Google®, but not common for all software engineers in all companies), and (iii) skills that are valuable. The Boolean query generation module may calculate a keyword list based on average salaries of the users who have this skill.

The Boolean query generation module may identify the keywords for companies based on (a) similar companies, (b) companies from which the candidate who are currently in this position were hired from, (c) companies that the users usually come from to the company. The Boolean query generation module may identify the keywords for titles based on (a) same title, (b) similar titles, (c) titles that the candidates who are currently in this position had before the users joined this job, and (d) titles that the candidates who are currently in the same title had before. The keyword for the experience is fixed by the recruiter. The excluded terms keywords are listed based on what recruiters use for negative terms (i.e. excluded terms). The Boolean query generation module identifies the keywords for Schools/Majors/Degrees based on backgrounds of the users who are currently in that particular role. For schools, the Boolean query generation module also consider the top schools that the company recruits from, and for majors and degrees the Boolean query generation module look at top majors and degrees for the candidates who have the same title.

The recruiter system may obtain an additional input from a recruiter, namely a specific job-description. In an embodiment, the job description parsing module parses and analyzing the job-description for specific background and skills needed for the open position.

The recruiter system may intelligently merge or augment the list of background keywords offered in the user-interface of the job description parsing module with the additional keywords obtained from analysis of the job-description. The recruiter system may allow the recruiters to run enriched queries against the various people databases.

The recruiter system may obtain an additional input from a recruiter, which is the CV/resume/user-profile of the candidate, and compute a compatibility score and/or a compatibility report for the candidate and provide the compatibility score and report to the recruiter. The compatibility score and report makes it easy for the recruiter to decide whether to spend additional time looking at the candidate or to summarily dismiss the candidate for the open position. The recruiter system may compute a match between one or more (or selected subset) candidates who are all in the people-database and thus provide a candidate list to the recruiter that is ordered based on the compatibility-score and this allows the recruiter to focus their time on potential best candidates.

The recruiter system is implemented as a a browser extension module (e.g. Chrome extension) where the extension resides as side-bar when the recruiter is exploring potential candidates (e.g. on LinkedIn®). The browser extension module allows the recruiter to specify the top keywords for the open-position being recruited for (e.g. based on the position and the job description). The browser extension module includes an ability to look at the candidates-profile data based on what the recruiter is browsing (e.g. any candidates professional networking website profile (e.g. LinkedIn®) that may browse by the recruiter. The browser extension module computes the compatibility-score and the compatibility report for the user profile and the position. The browser extension module shows the compatibility-score and the report within the extension so that the recruiter can quickly decide whether or not to devote time to that candidate's profile.

A message generation module may automatically draft an email or a message and send the email to the candidate, which states that (i) there is a good match for your profile with a particular open position, (ii) why there is a good match for your profile and (iii) why the recruiter should consider your profile for applying for the open position. The message generation module may allow the recruiter to modify or update the email before sending the email to the candidate.

The recruiter system may provide three big benefits to users. First, the keyword prioritization module may automatically suggest keywords that the recruiter should use to build their query. In an embodiment, the keywords could be a skill the candidates should possess, e.g. HTML5, CSS JavaScript, Python etc. In another embodiment, the keywords could also be past position titles, past companies, length of experience in a certain role, colleges they went to, and so forth. Basically any keywords to filter out unwanted candidates and to include desired candidates in the search process. The opportunity network system may help the recruiter with appropriate keywords since the opportunity network system already deeply understands/knows the background of people (e.g. users) currently in that role, which is captured in position-detail information. Often this information is not clear beforehand to recruiters or even to hiring managers in companies.

Second, the boolean query construction module may help the recruiters to construct Boolean queries using these desired keywords (e.g. with ultimate override capability for the human recruiter). In an embodiment, the frequent recruiters are not engineers to deeply apply Boolean logic to construct queries with ANDS, ORs, NOTs, and parenthesis and prioritization, which is not simple. Even for experts it can be very error prone. As shown in FIG. 9A, the opportunity network system may provide a simple checkbox UI to suggest and include keywords and even to add custom keywords based on recruiters' (or hiring managers) knowledge. This includes dealing with particularly "NOT" clauses, e.g., non-recruiter, not staffing, not-VP, and so on.

Third, a query execution module does the customization of the queries to different search engines. While most search engines (e.g. LinkedIn®, Google®, Bing®, custom ones in Application Tracking Systems) may support similar Boolean logic, the exact syntax to express those queries or to limit the scope of the queries is not the same. For example, how you specify that the location of the candidates should be "Greater Seattle Area" is handling different in Google® and LinkedIn®. The recuiter system may understand such syntax variations deeply, and the recuiter system understands the application programming interfaces (APIs) of custom engines deeply, to automatically issue the right queries to the search engines. The issued queries can also be saved for later for incremental changes or as templates for future queries.

Brief Description of Modules in the Recruiter System: (See FIG. 2) According to an embodiment, the recruiter system includes a entity information database, an a web information extracting module, a job description module, a keyword generation module, a keyword prioritization module, a query execution module, a boolean query construction module, a filter generation module, a position compatibility module, a position detail profile generation module, a browser extension module, a candidate ordering module and a message generation module.

The rich entity information database stores information about various details of job openings from one or more websites and candidates profile or resume.

The web information extracting module obtains a plurality of entities that emerge from the analysis of the plurality of job openings from the job description module and gathers additional information from websites and web databases about each of the entities. The web information extracting module is further responsible for merging the entities which initially appeared as distinct during parsing (e.g. titles of software engineer and software development engineer, or university names Stanford and Leland Stanford University).

The a keyword generation module is configured to automatically determines a set of position-detail keywords for a search query to find one or more candidates for the target position based on the position detail profile for the target position.

The keyword prioritization module automatically prioritizes the set of position-detail keywords based on at least a frequency of occurrence of the position-detail keywords in the background details of the users currently in the role corresponding to the target position to obtain a prioritized set of keywords.

The position compatibility module may dynamically compute a compatibility report and/or compatibility score for (i) a given profile or resume information of the recruiter, (ii) the position detail profile for a given position, and (iii) a specific job description that the candidate is interested in applying for. The position compatibility module may compute the most important requirements from a job description and use that to match the user's fit with that specific position. The position compatibility module determines a compatibility score between candidates in the candidate list returned from the people database or the search engine, and the position detail profile of the target position using machine learning or a statistical technique and the compatibility score is determined by comparing previous positions, skills, and educational background of the candidates with the background details of users currently in a role corresponding to the target position.

The query execution module executes a search query based on the prioritized set of job description keywords on one or more (a) people databases or (b) search engines based on APIs or a query syntax of the search engines, to obtain a candidate list The boolean query construction module constructs a boolean query on a boolean query interface based on positive keywords, negative keywords, and the filters separated by boolean operators, wherein the negative keywords are used to exclude candidates associated with the negative keywords from appearing in the candidate list.

The candidate ordering module orders the candidate list based on the compatibility scores of candidates in the candidate lists to obtain an ordered candidate list that is ordered based on compatibility scores.

The message generation module provides a communication interface to enable the recruiter to communicate with candidates in the ordered candidate list. The message generation module may provide a rich search option to the user to search for people and to send messages to another user, which are received only when the messaging preferences of the user (e.g. who going to receive the message) are met. The message generation module may reference a people directory that stores profiles of users.

The filter generation module causes prioritizing a set of filter properties that are shown in the Boolean query interface based on at least a frequency of occurrence of properties in the background details of the users currently in the role corresponding to the target position, wherein the filter properties comprise frequently occurring values of background details associated with the filter in the position detail profile of the target position and the filter generation module filters separated by boolean operators, wherein the negative keywords are used to exclude candidates associated with the negative keywords from appearing in the candidate list.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description.

Referring now to the drawings, and more particularly to FIGS. 1 through 13, where similar reference characters denote corresponding features consistently throughout the figures, preferred embodiments are shown. Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

FIG. 1 illustrates a recruiter system 106 that obtains entity information from a plurality of users 102A-N and websites 110 to generate a candidate list according to an embodiment herein. The recruiter system 106 generates the opportunity map that provides visibility to a comprehensive landscape of relevant candidates to a recruiter. The plurality of users 102A-N may be recruiters. The opportunity map may be generated based on (a) information entered into the recruiter system 106 by the recruiter 102A, (b) information from a data-analysis of a plurality of resumes of candidates available in the websites 110, and (c) one or more resumes directly imported to the recruiter system 106 by the recruiter 102A. The opportunity map includes a plurality of possible subsequent positions. Each possible subsequent position of the opportunity map represents a distinct target position (e.g. possible subsequent positions) that the recruiter 102A may be able to hire the candidate (within the same company (e.g. a current company) or at different companies/institutions) based on eligibility of the candidates. The recruiter system 106 extracts information from publically available websites 110 through a network 108 and stores the extracted information (e.g. entity information of the plurality of possible subsequent positions) in a database associated with the recruiter system 106. In one embodiment, the database stores the entity information that directly received from the recruiters using the recruiter system 106. In an embodiment, the extracted information is stored in a server. The recruiter system 106 is operated in a computing device 104. In one embodiment, the recruiter system 106 is operated in the server to generate the candidate list. The computing device 104 may be but is not limited to a server, a distributed network of servers, a laptop, a mobile phone, a tablet, and/or a personal computer, etc.

Figure 2:
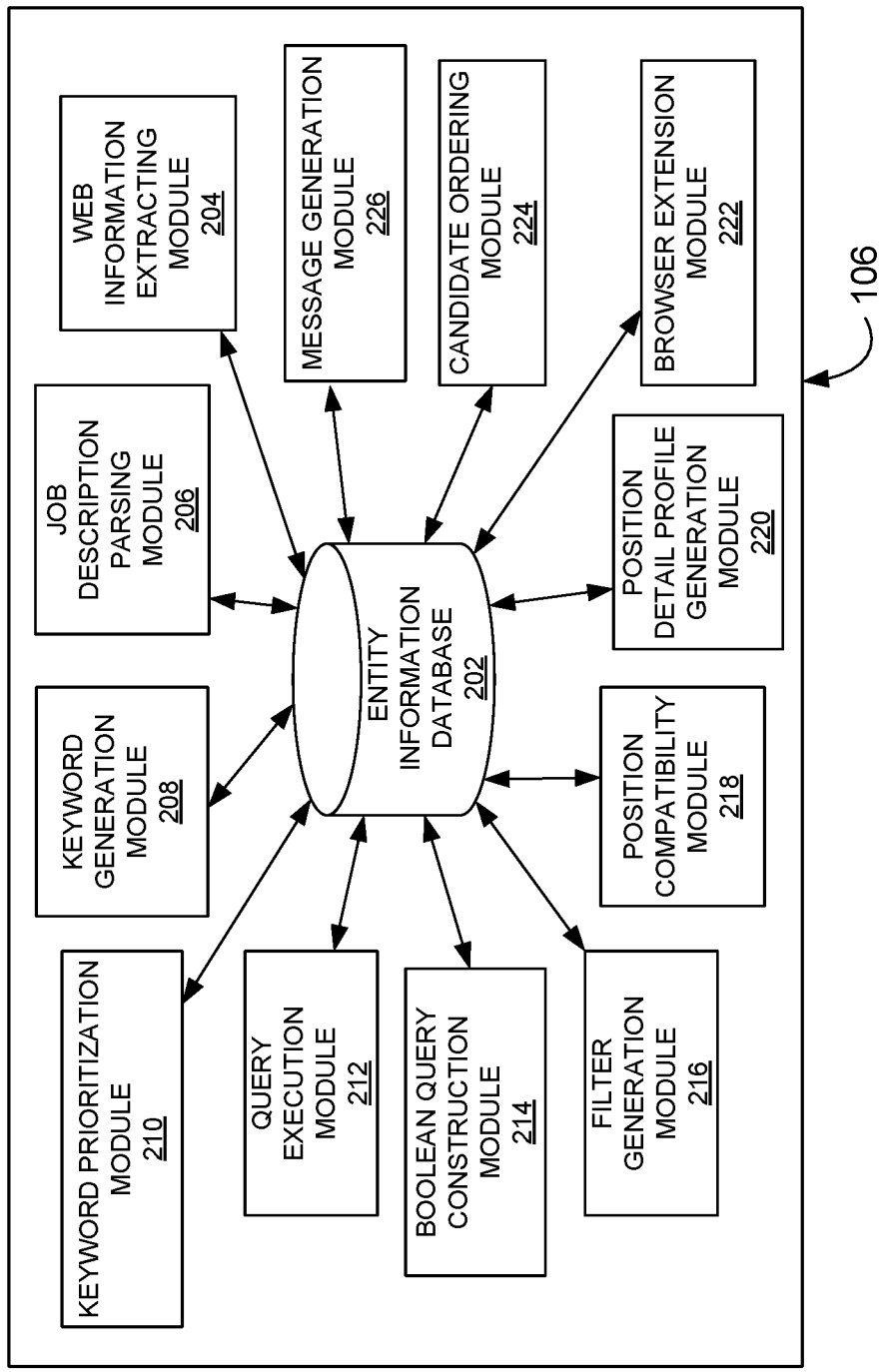
FIG. 2 illustrates an exploded view of the recruiter system for identifying, ordering, and contacting candidates for a target position based on a position detail profile for the target position according to an embodiment herein; of FIG. 1 according to an embodiment herein.

FIG. 2 illustrates an exploded view of the recruiter system 106 for identifying, ordering, and contacting candidates for a target position based on a position detail profile for the target position according to an embodiment herein. The recruiter system 106 includes a entity information database 202, a web information extracting module 204, a job description module 206, a keyword generation module 208, a keyword prioritization module 210, a query customization module 212, a boolean query construction module 214, a filter generation module 216, a position compatibility module 218, a position detail profile generation module 220, a browser extension module 222, a candidate ordering module 224 and a message generation module 226. These modules function as has been described above.

FIG. 3 illustrates a user interface view of an opportunity map specific to a location where companies hire for a specific title according to an embodiment herein. The recruiter system 106 provides the user interface view of the opportunity map specific to the location when the recruiter 102 selects 'companies that hire for a title in a specific location' under professionals tab from system tools. The user interface view provides one or more possible subsequent positions that are specific to a particular location that is selected by the recruiter 102A. For example, FIG. 9 displays a financial analyst position from various companies (e.g. IBM®, Goldman Sachs®, Wells Fargo® etc.) in New York City. The user interface view provides (a) a company name field that represents that represents names of companies listed, (b) a title field that represents a title for a specific position, (c) a title count field that represents how many people previously made the transition to the given position in the specific location, (d) a company size field that represents size of a company (e.g. a larger scale company or middle scale company) and (e) a salary field that represents a salary associated with the specific position in each company. The user interface view allows the recruiter 102A to filter the result by entering a specific company. For example, if one enters the company name as IBM® in a search field, the user interface view displays position details specific to IBM®. The user interface view may allow the recruiter 102A to filter the results using (a) a salary range, (b) a company size, (c) number of positions and (d) an industry type etc.

FIGS. 4A and 4B illustrate user interface views of an opportunity map that provide position details for a specific position to recruiters according to an embodiment herein. The recruiter system 106 provides the user interface view of the opportunity map specific to background of a candidate when the recruiter 102A select 'backgrounds, skills and salary of any position' under a professionals tab from system tools. The user interface provides ability to dig deep (e.g. detailed information) about any position that displayed in the opportunity map. The user interface provides a summary view and great set of curated resources from the websites 110. The user interface views provide a compatibility score to the candidate to the recruiter 102A for a selected position (e.g. Associate@ Goodwin Procter LLP or Primary Patent Examiner@ USPTO). For example, the user interface provides the compatibility score as 76% for associate at a company Goodwin Procter LLP and as 85% for Primary Patent Examiner at the USPTO. The user interface views provide an average salary associated with selected/given positions (e.g. Salary for Associate at Goodwin Procter LLP: Min: $160K, Median: $185K, Max: $230K and an average salary for primary patent examiner at USPTO: $125k).

The recruiter system 106 explores background, skills, and job history of the plurality of candidates in a specific position to calculate a compatibility score of the candidate. The user interface views provide entities required for the selected position (e.g. skills required for the selected/given position, years of experience required for the selected/given position, schools, majors and certifications that are required for the selected/given position etc.). The user interface views provide option to search for the people who are working in the selected position. The user interface views dynamically provide a career pathway that displays a previous position of the candidates and a suggested possible subsequent position after the selected position (e.g. Associate@ Goodwin Procter LLP or Primary Patent Examiner@ USPTO) for the user 102A.

For example, when the recruiter 102A gives a position title as associate at a company Goodwin Procter LLP, the career pathway provides the previous positions as associate at Latham & Watkins and summer Associate at Goodwin Procter LLP. Further the career pathway provides possible subsequent positions as Partner at Goodwin Procter LLP and Of Counsel at Goodwin Procter LLP (as depicted in FIG. 10A). Further for example, when the recruiter 102A provides a position title as Primary Patent Examiner at USPTO, the career pathway provides previous positions as Assistant Patent Examiner at USPTO, any other position at USPTO and Patent Examiner at USPTO. Further the career pathway provides possible subsequent positions as Supervisory Patent Examiner at USPTO, Patent Attorney at USPTO and Associate at Ropes & Gray LLP The next position for the candidate is identified based on resumes of the people who previously worked in the same position as the candidate. For example, if the candidate was a "software engineer" at Microsoft®, the recruiter system 106 looks for the resumes of the people who were "software engineers" at Microsoft®, but who have left that position. The recruiter system 106 gets the list of all such next positions and weights them based how long ago the candidate made the move to the next position, and a frequency (e.g. how many people made that transition).

Figure 5:
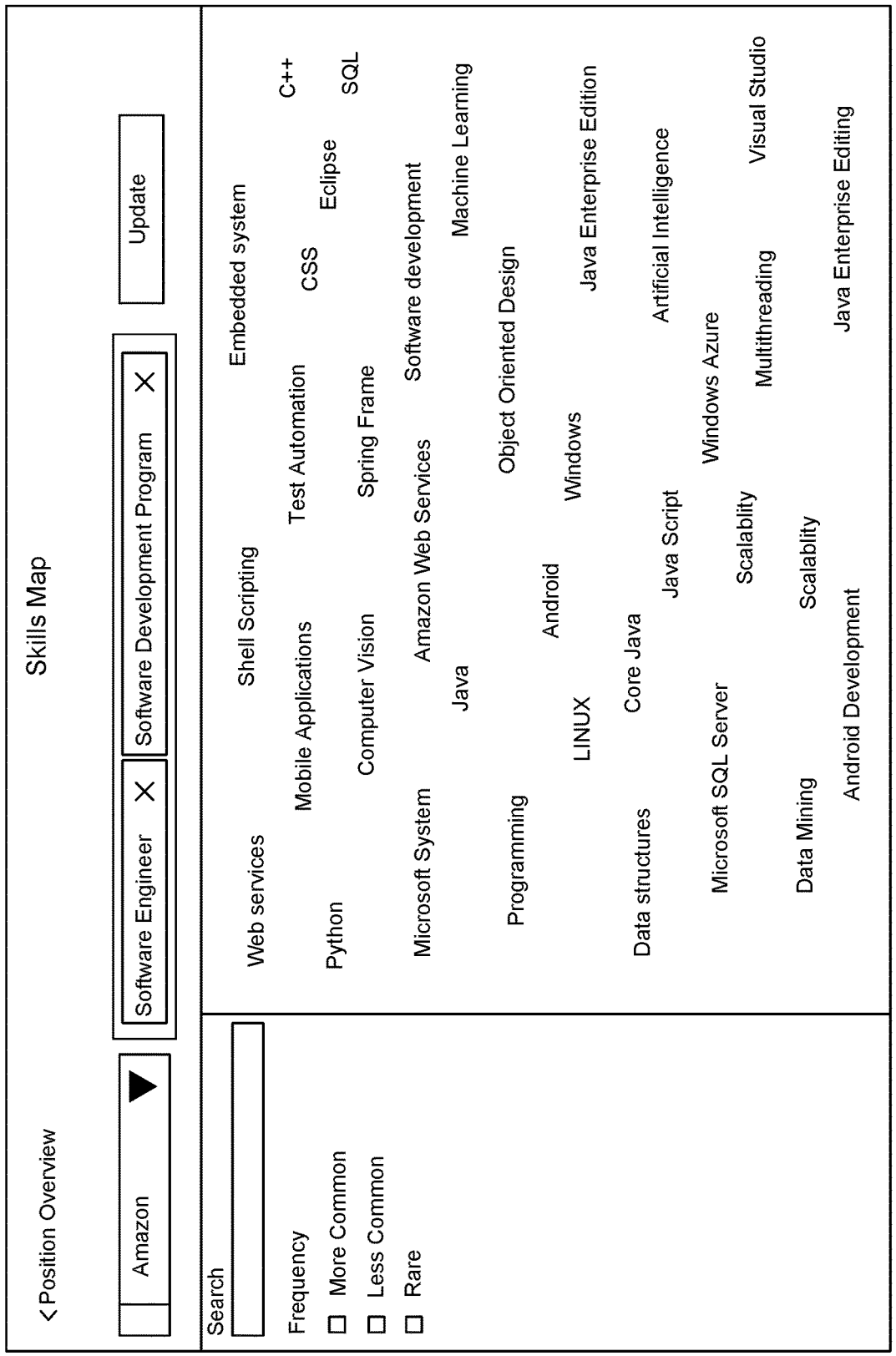
FIG. 5 illustrates a user interface view of a map of skills possessed by a plurality of candidates who are currently holding a selected position according to an embodiment herein.

FIG. 5 illustrates a user interface view of a map of skills (e.g. also known as a skills map) of candidates who are currently in a selected position according to an embodiment herein. The skills map is generated based on the skills of candidates who are currently in the selected position. The skill map represents the skills that are required for the candidates for a given position in a particular company (e.g. Software Engineer and Software Development Engineer at Amazon®). The skill map may display highly required skills for the recruiter 102A for the given position in a different font size and/or a different text color. The skill map may display required skills of the candidates to the recruiter 102A in centre of the skill map. In an embodiment, if the candidate does not have any particular skill associated with the selected position, the skill map may help the recruiter 102A to identify the missing skill associated with the selected candidate and to find another candidate for the selected position.

FIG. 6 illustrates a user interface view of map of schools that illustrates a plurality of schools attended by candidates who are currently working in the selected position according to an embodiment herein. The user interface view of the map of schools may also provide a list of schools attended by candidates who have previously worked in the selected position.

FIG. 7 illustrates a user interface view of an opportunity map specific to companies that hire alumni in a specific location according to an embodiment herein. The recruiter system 106 provides the user interface view of the opportunity map for students when the recruiter 102A selects 'companies that hire alumni in a location' under a students tab from system tools. The user interface view of the opportunity map provides the landscape of opportunities (e.g. possible subsequent positions) for candidates based on alumni hired by the companies in a specific location. For example, the user interface view shows the companies that hire alumni in New York City after completing a bachelor's degree in computer science at Carnegie Mellon University. The user interface view provides an option to filter the choices (e.g. the companies) offered based on (a) company size and (b) industry type. In addition, the user interface allows filtering choices using keyword searches (e.g. by entering a company name). The user interface view provides (a) a company name field that represents a name of a company that hires the alumni, (b) an alumni count field that represents the number of people previously hired by each company and (c) a company size field that represents size of a company (e.g. a larger scale company or middle scale company).

Figure 8:
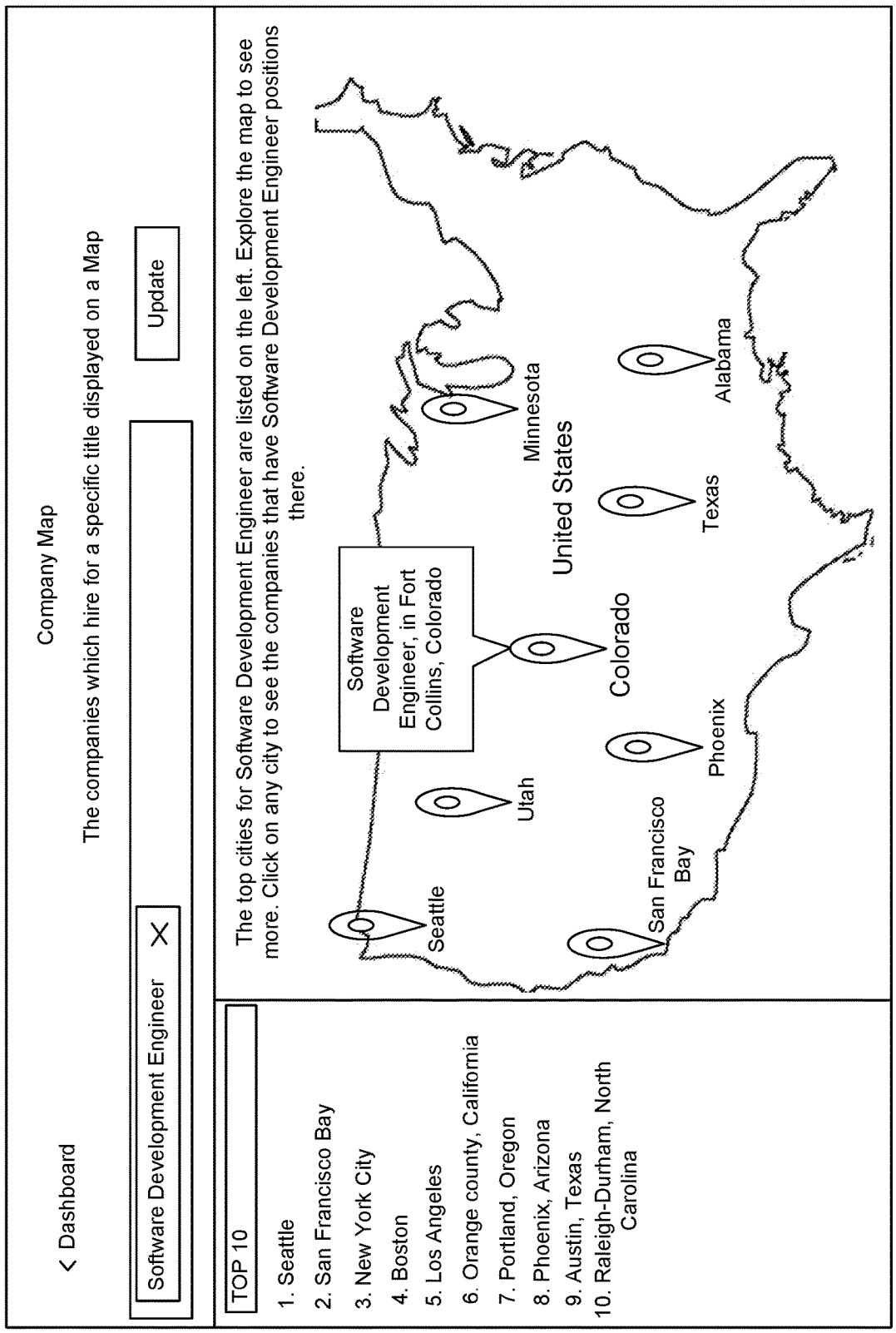
FIG. 8 illustrates an exemplary user interface view that shows a map of cities and companies within each city that hire for a particular position according to an embodiment herein.

FIG. 8 illustrates an exemplary user interface view that shows a map of cities and companies within each city that hire for a particular position according to an embodiment herein. The exemplary user interface view shows top cities that hire for the particular position (e.g. a software development engineer). In an embodiment, the user interface view shows the companies in the city that hire for the particular position based on a predefined ranking of the companies. The user interface view provides an option to the user recruiter 102A to search for the position in a company based on a current position of the candidate. In another embodiment, the user interface view provides an option to the user recruiter 102A to search for the position in the company in the particular city based on the experience of the candidate.

FIGS. 9A and 9B illustrate user interface views of a query customization for recruiters according to an embodiment herein. The query customization interface 902 for recruiters provides options to a recruiter to build a query for hiring a suitable candidate for a particular position (e.g. Software Development Engineer@ Amazon®). The user interface view allows the recruiter to select a job title to add a query. The user interface view provides a pre-populated set of options for location, skills, companies, titles, etc. The pre-populated set of options is pre-populated based on an analysis of resumes of the plurality of candidates who are currently working in this position. Also the set of options are pre-populated based on the entities directly entered in the recruiter system 106 by the recruiter (e.g. the skills that the plurality of candidates have, a set of companies that the plurality of candidates came from, a plurality of schools that the plurality of candidates studied in, etc.). In an embodiment, the recruiter system 106 automatically builds Boolean queries. The recruiter system 106 allows the recruiter to run the same Boolean queries on professional networking websites (e.g. LinkedIn®, Google®) as X-Ray search and on the entity information database 202. The search query is automatically customized for each search engine as they have different formats. The user interface views filter properties 906 that allow the recruiter to select (a) locations from where the recruiter is interested to hire the candidates for a position (e.g. Greater Seattle Area 904A, San Francisco Bay Area etc.), (b) skills that required for candidates for the position (e.g. Java, C, C++, JavaScript 904B etc.), (c) companies from where the recruiter is interested to the candidates, (d) titles (e.g. of positions that are presently occupied by the candidates) that are of interest to the recruiter to hire for the current position, (e) excluded terms for titles that are not of interest to the recruiter to hire for the position, (f) years of experience required for the candidates for the position (e.g. less than 1 year, 1 to 2 years etc.), (g) one or more schools from where the recruiter is interested to hire for the position (e.g. the candidates must have graduated from the selected schools), (h) majors and degrees that are a must for the candidates for the position and (i) certifications that are essential for candidates to be considered for the position. The user interface views also includes automatically includes excluded terms for titles 906 which allows the recruiter exclude unwanted keywords from the search query.

Figure 10:
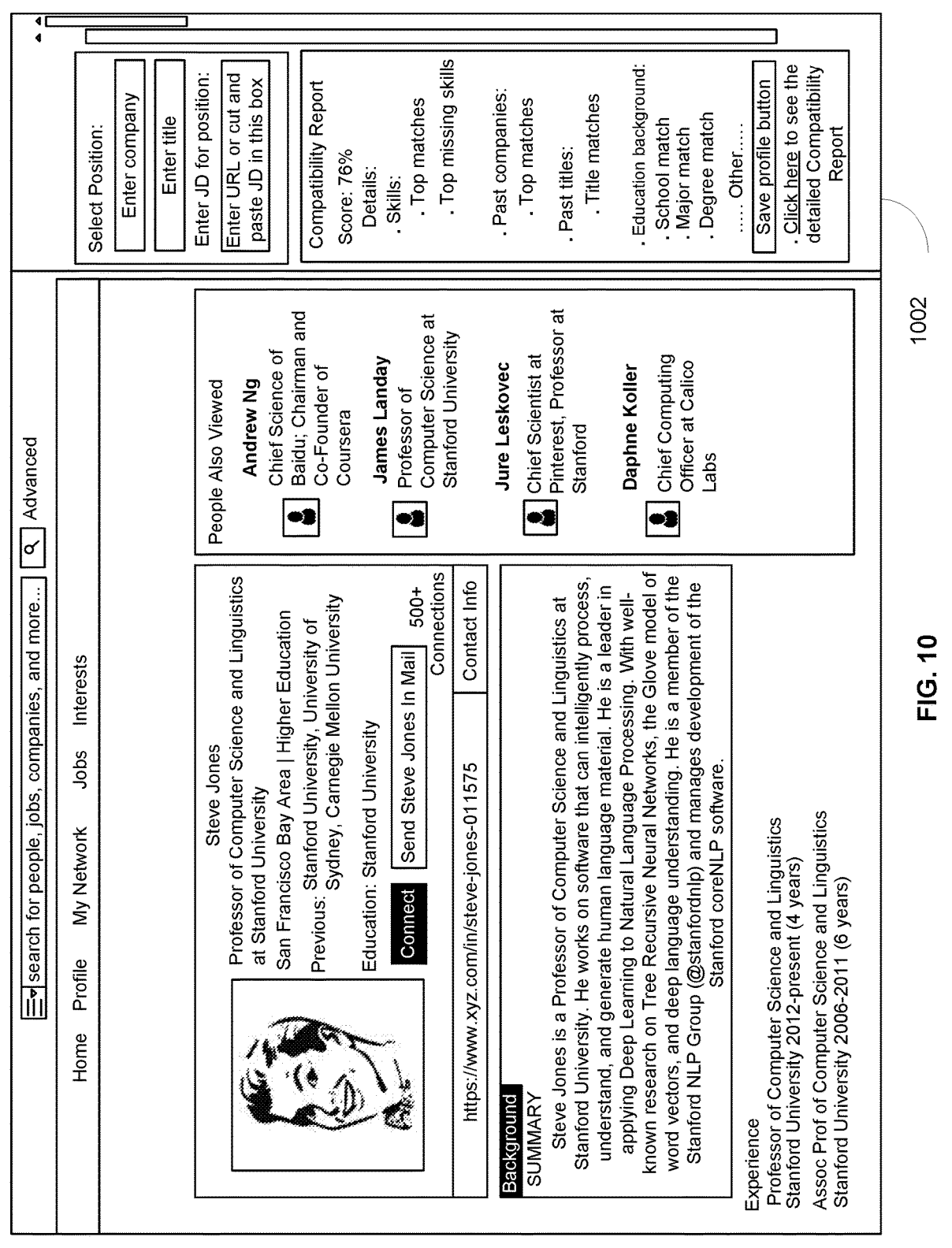

FIG. 10 illustrates a user interface view of a Boolean query generation and browser-extension according to an embodiment herein. The user interface views show the Boolean query generation and browser-extension in a professional networking website, according to one embodiment. The professional networking websites may be a job portal or a website that includes a professional profile (e.g. educational details, skills and certifications, past companies, previous titles etc.) of the candidate. The Boolean query generation and browser-extension gets full-access to the data (e.g. entity information of the plurality of job openings) on the professional networking website without any legal violations when the Boolean query generation and browser-extension is being on the professional networking website as a professional networking website profile. The Boolean query generation and browser-extension fetches the entity information of the job openings from the professional networking website profile and processes the entity information through the Boolean query generation and browser-extension logic to show a relevance of the candidates expertise/skills, peer ranking, etc.

The functionality as a browser extension (e.g. a chrome-extension for a Boolean query generation) of the recruiters of the recruiter system 106 is different but the appearance and where the extension shows up is similar on the professional networking website profile or other websites' people-profile pages. The user interface view provides a full compatibility report about the candidate (e.g. Steve Jones). The user interface view obtains the information from a recruiter as follows: (a) a company name, (b) a title for a position and (c) a job description for the position. Once the information is obtained from the recruiter, the network opportunity system calculates the full compatibility report for the candidate. The compatibility report includes (a) a compatibility score for the candidate (e.g. 76%), (b) top skills of the candidate that matches with a current position detailed profile and (c) top skills that missing (e.g. the skills that the candidate don't have). The compatibility report further includes (a) past companies of the candidate that match with the current position detailed profile (e.g. a position that the recruiter looking for), (b) past titles of the candidate that match with the current position detailed profile and (c) educational background details (e.g. school, major and degree of the candidate that match with the current position detailed profile). The full compatibility report may help the recruiter to shortlist the candidate for the position that the recruiter looking for.

Figure 11A:
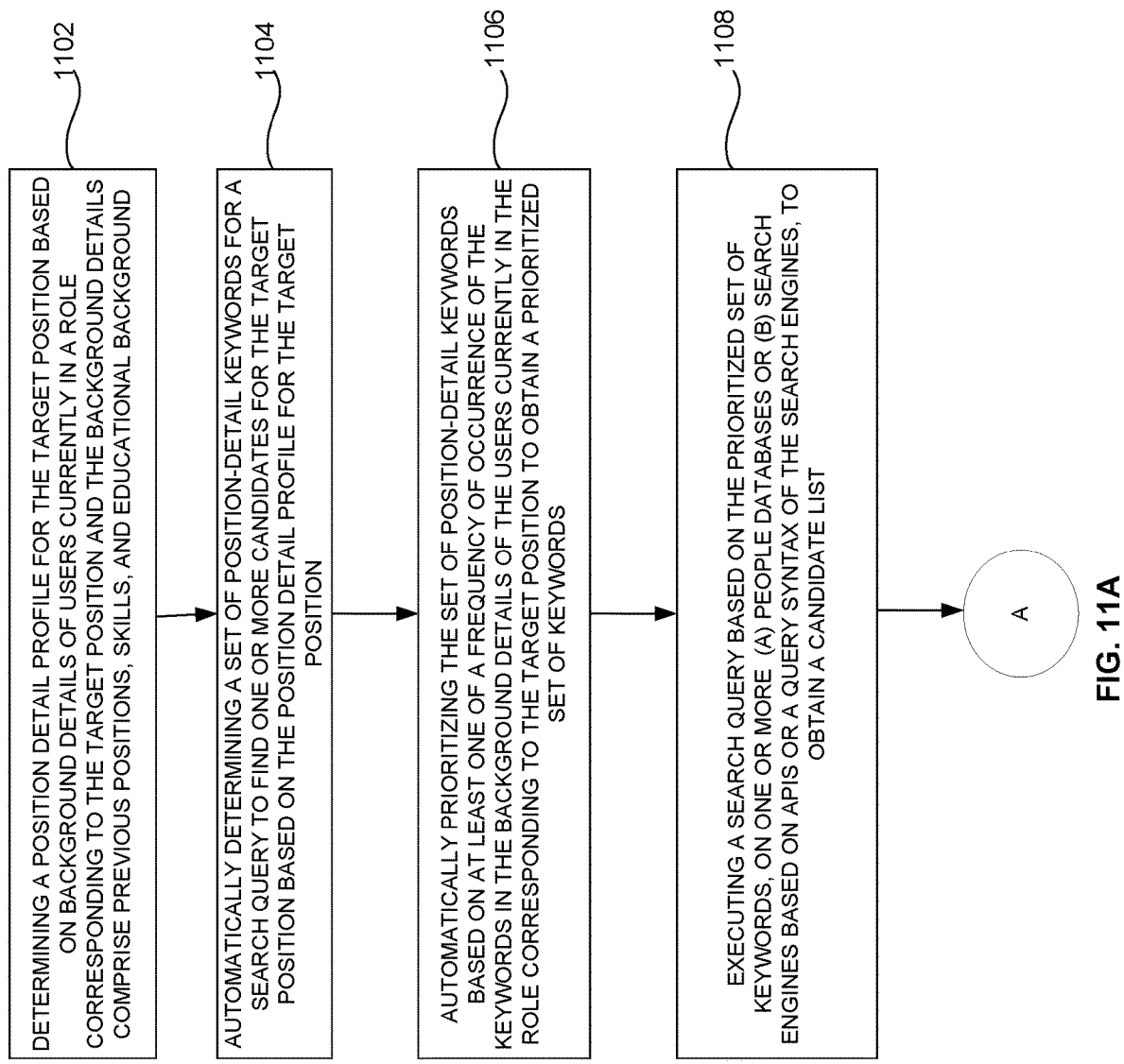
FIGS. 11A-11B illustrate a method for identifying, ordering, and contacting candidates for a target position based on a position detail profile for the target position according to an embodiment herein.
Figure 11B:
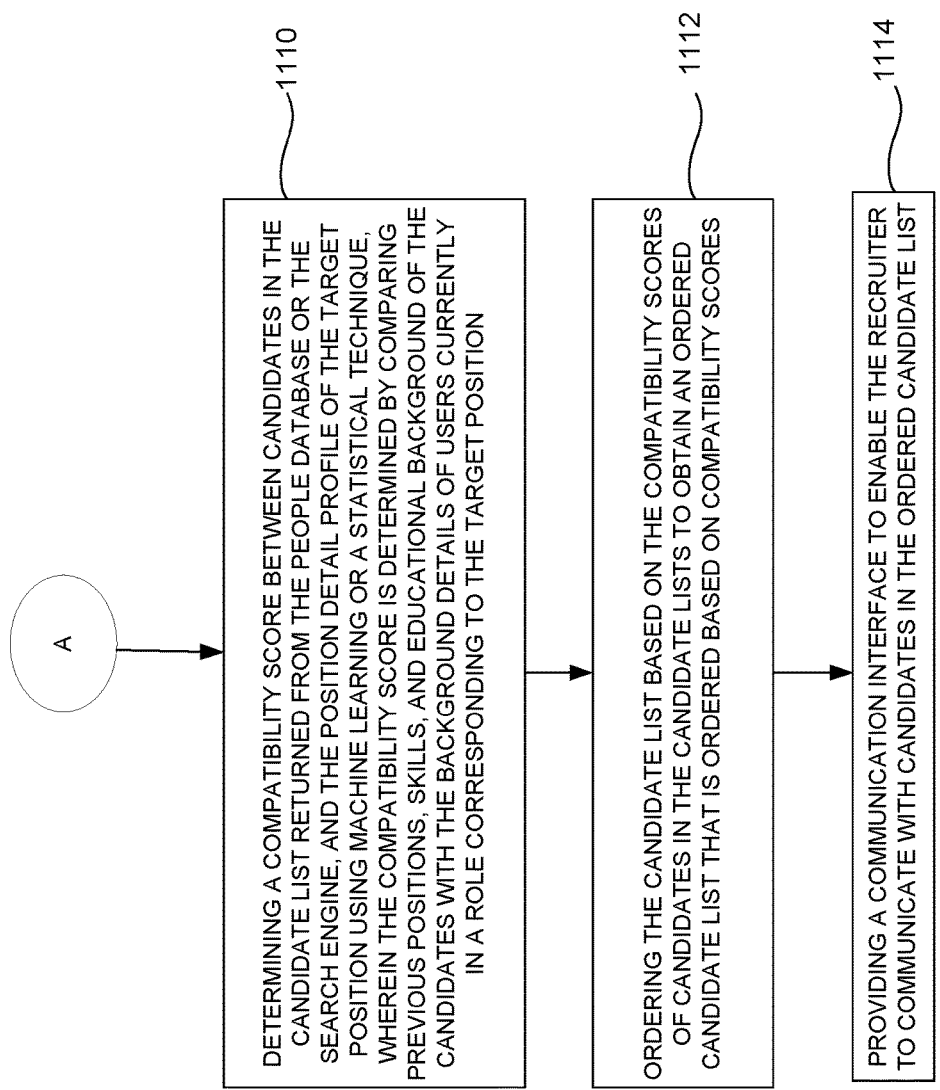

FIGS. 11A-11B illustrate a method for identifying, ordering, and contacting candidates for a target position based on a position detail profile for the target position according to an embodiment herein. At step 1102, determining a position detail profile (for e.g. using a position detail profile generation module 220) for the target position based on background details of users currently in a role corresponding to the target position and the background details includes previous positions, skills, and educational background. At step 1104, automatically determining a set of position-detail keywords (for e.g. using a keyword generation module 208) for a search query to find one or more candidates for the target position based on the position detail profile for the target position. At step 1106, automatically prioritizing the set of position-detail keywords (for e.g. using a keyword prioritization module 210) based on at least one of a frequency of occurrence of the keywords in the background details of the users currently in the role corresponding to the target position to obtain a prioritized set of keywords. At step 1108, executing a search query (for e.g. using a query execution module 212) based on the prioritized set of keywords, on one or more (a) people databases or (b) search engines based on APIs or a query syntax of the search engines, to obtain a candidate list. At step 1110, determining a compatibility score (for e.g. using a position compatibility module 218) between candidates in the candidate list returned from the people database or the search engine, and the position detail profile of the target position using machine learning or a statistical technique, wherein the compatibility score is determined by comparing previous positions, skills, and educational background of the candidates with the background details of users currently in a role corresponding to the target position. At step 1112, ordering the candidate list (for e.g. using a candidate ordering module 224) based on the compatibility scores of candidates in the candidate lists to obtain an ordered candidate list that is ordered based on compatibility scores. At step 1114, providing a communication interface to enable the recruiter to communicate with candidates in the ordered candidate list (for e.g. using a message generation module 226).

Figure 12:
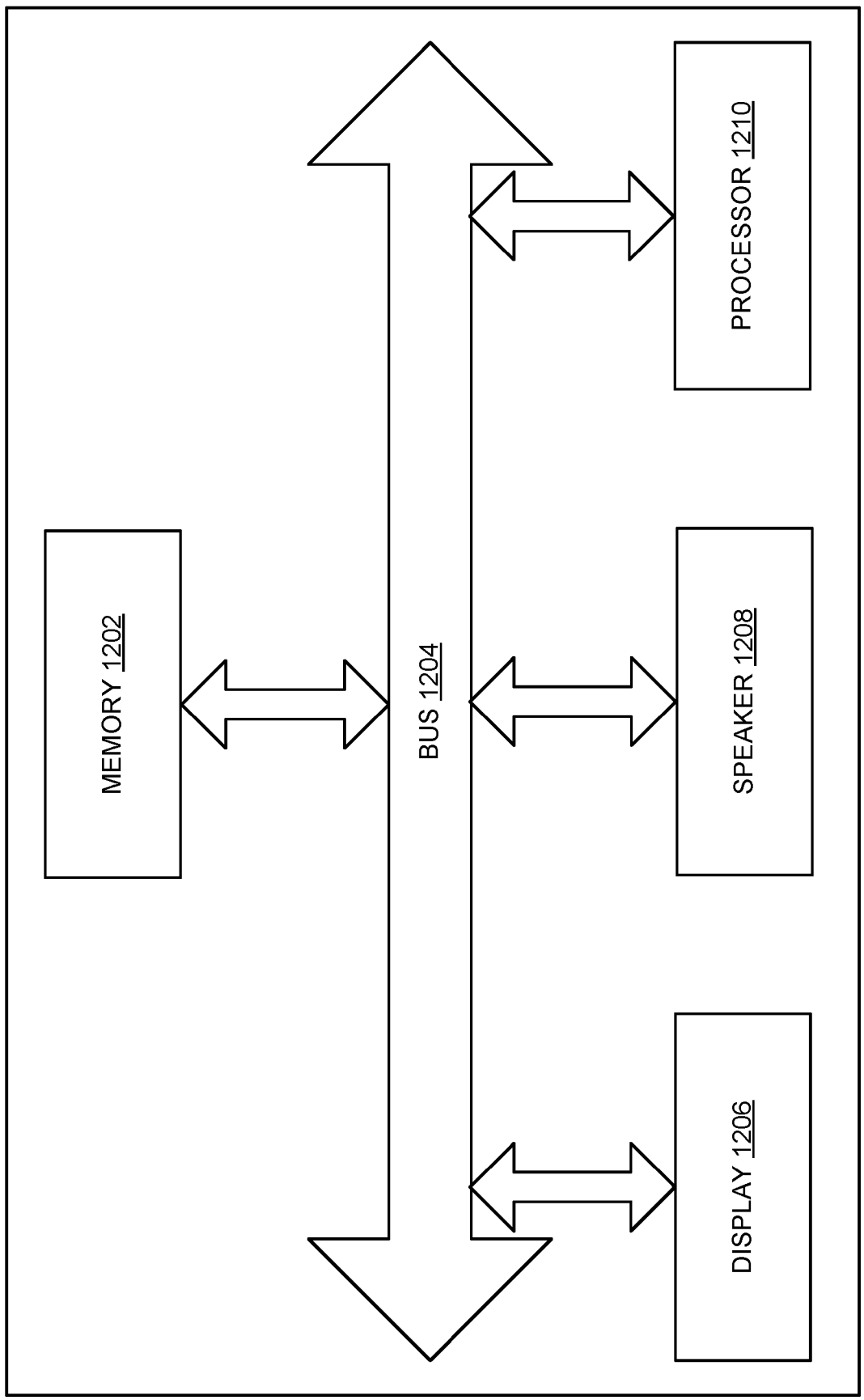
FIG. 12 illustrates an exploded view of a device that may be used to access the opportunity network system of FIG. 1 according to the embodiments herein.

FIG. 12 illustrates an exploded view of the personal communication device having a memory 1202 having a set of computer instructions, a bus 1204, a display 1206, a speaker 1208, and a processor 1210 capable of processing a set of instructions to perform any one or more of the methodologies herein, according to an embodiment herein. In one embodiment, the receiver may be the personal communication device. The processor 1210 may also enable digital content to be consumed in the form of video for output via one or more displays 1206 or audio for output via speaker and/or earphones 1208. The processor 1210 may also carry out the methods described herein and in accordance with the embodiments herein.

Digital content may also be stored in the memory 1202 for future processing or consumption. The memory 1202 may also store program specific information and/or service information (PSI/SI), including information about digital content (e.g., the detected information bits) available in the future or stored from the past. The user of the personal communication device may view this stored information on display 1206 and select an item of for viewing, listening, or other uses via input, which may take the form of keypad, scroll, or other input device(s) or combinations thereof. When digital content is selected, the processor 1210 may pass information. The content and PSI/SI may be passed among functions within the personal communication device using the bus 1204. The product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
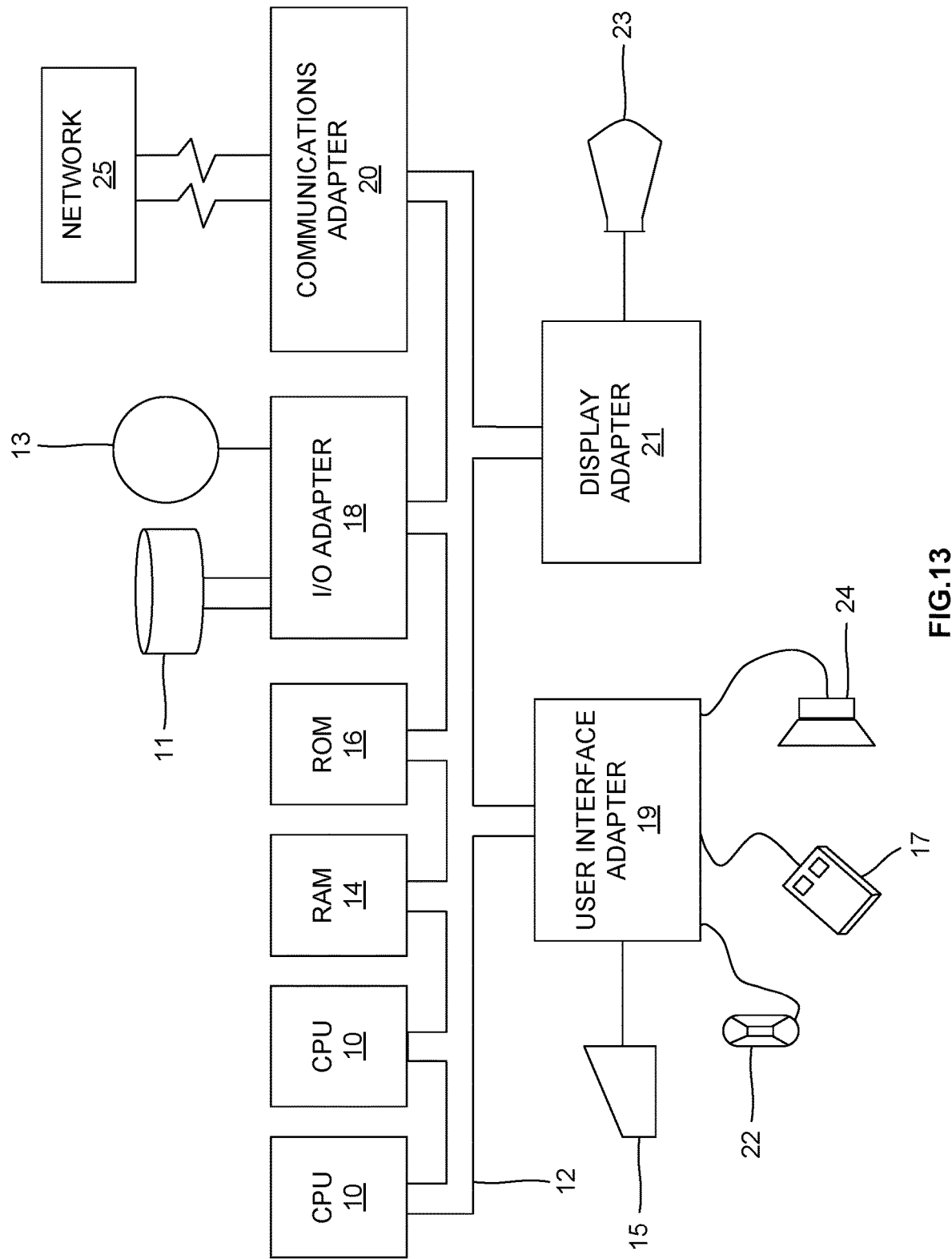
FIG. 13 a schematic diagram of computer architecture used in accordance with the embodiments herein.

A representative hardware environment for practicing the embodiments herein is depicted in FIG. 13. This schematic drawing illustrates a hardware configuration of an information handling/computer system in accordance with the embodiments herein. The system includes at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The opportunity network system 106 may provide a public directory for professionals, students and recruiters for the digital world to make their work easier. The opportunity network system 106 is the default messaging platform for outreach beyond immediate contacts. The opportunity network system 106 may provide an underlying profile and messaging platform for recruiting, direct messaging, sales-lead generation, online surveys, and online communities etc.

The opportunity network system 106 can be used to discover skills required for long-term career growth. The opportunity map can be used to discover and access relevant external links, discussion boards, FAQ's that are associated with the role and transitions. The opportunity network system 106 further provides professionals the ability to freely explore different pathways and options and ask the "what if" career questions that are meaningful to the professionals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments.

The invention claimed is:

1. One or more non-transitory computer readable storage mediums storing one or more sequences of instructions, which when executed by one or more processors automatically pre-populates a user interface of a Boolean query builder for recruiters to generate, customize, and execute a customized Boolean search query across people databases or search engines, by performing the steps of:

automatically determining a set of suggested position-detail keywords that are suggested based on an analysis of user profiles who are currently in a role corresponding to a target position or who have previously worked at the role corresponding to the target position that are available in a database, wherein the set of position-detail keywords are selected from at least one of skills, titles, and companies of users who are currently in the role corresponding to the target position or who have previously worked at the role corresponding to the target position using a machine learning or a statistical technique;

automatically prioritizing the set of suggested position-detail keywords based on at least one of a frequency of occurrence of the suggested position-detail keywords in at least one of skills, certifications, years-of-experience, previous positions from which the users have joined the target position, and a past educational background from which the users joined the target position, to obtain a set of prioritized suggested position-detail keywords using the machine learning or the statistical technique;

pre-populating a user interface of the Boolean query builder for recruiters with the set of prioritized suggested position-detail keywords for searching people databases or search engines using the set of prioritized suggested position-detail keywords;

processing a selection or overriding of any of the prioritized suggested position-detail keywords from the user interface of the Boolean query builder for recruiters and enabling adding custom keywords that were not automatically suggested, to generate a Boolean search query for searching people databases or search engines using the selection of the any of the prioritized suggested position-detail keywords;

generating the Boolean search query based on the selection of the any of the prioritized suggested position-detail keywords that are selected from (i) companies based on at least one of (a) similar companies having the target position, (b) companies from which the persons who are currently in this position were hired from, and (c) companies that the persons usually come from to the company associated with the target position and (ii) titles based on at least one of (a) a same title, (b) similar titles, (c) titles that the candidates who are currently in this position had before the users joined this job, and (d) titles that the persons who are currently in the same title had before, wherein the Boolean search query comprises:
    keywords corresponding to a first skill and a second skill separated by an OR operator combined with an AND operator with keywords corresponding to a first title and a second title separated by an OR operator, and combined with an AND operator with keywords corresponding to a first company and a second company separated by an OR operator;
automatically customizing a format of the Boolean search query for the one or more (a) people databases or (b) search engines based on the application programming interfaces (APIs) of custom engines of the people databases or search engines and syntax variations in the people databases or search engines to obtain the customized Boolean search query for searching people databases or search engines using the selection of the any of the position-detail keywords;
executing the customized Boolean search query on the one or more (a) people databases or (b) search engines to obtain a list of relevant potential candidates from across the people databases or search engines;
determining areas of match and areas of mismatch between the candidate from a candidate list and the target position to generate a compatibility report; and
displaying a compatibility score and the compatibility report of the candidate for the target position within a browser extension as a side-bar while browsing a profile of the candidate to enable making a quick decision on the candidate.

2. The one or more non-transitory computer readable storage mediums storing the one or more sequences of instructions of claim 1, which when executed by the one or more processors further causes prioritizing a set of filter properties that are shown in the Boolean query interface based on at least a frequency of occurrence of properties in the background details of the users currently in the role corresponding to the target position, wherein the filter properties comprise frequently occurring values of the background details associated with the filter in the position-detail profile of the target position.

3. The one or more non-transitory computer readable storage mediums storing the one or more sequences of instructions of claim 1, which when executed by the one or more processors further causes assigning weights to each of the prioritized keywords; wherein the Boolean query is executed based on the prioritized set of keywords and the weights assigned to each of the prioritized keywords on the one or more (a) people databases or (b) search engines based on APIs or a query syntax of the search engines, to obtain the candidate list.

4. The one or more non-transitory computer readable storage mediums storing the one or more sequences of instructions of claim 1, which when executed by the one or more processors further causes the communication interface to automatically generate a draft message to a candidate, wherein the message comprises an indication (i) that the candidate is a good match for the target position, (ii) and why the candidate is a good match for the target position.

5. A processor implemented method for automatically pre-populating a user interface of a Boolean query builder for recruiters to generate, customize, and execute a customized Boolean search query across people databases or search engines, comprising:
automatically determining a set of suggested position-detail keywords that are suggested based on an analysis of user profiles who are currently in a role corresponding to a target position or who have previously worked at the role corresponding to the target position that are available in a database, wherein the set of position-detail keywords are selected from at least one of skills, titles, and companies of users who are currently in the role corresponding to the target position or who have previously worked at the role corresponding to the target position using a machine learning or a statistical technique;
automatically prioritizing the set of suggested position-detail keywords based on at least one of a frequency of occurrence of the suggested position-detail keywords in at least one of skills, certifications, years-of-experience, previous positions from which the users have joined the target position, and a past educational background from which the users joined the target position to obtain a set of prioritized suggested position-detail keywords using the machine learning or the statistical technique;
pre-populating a user interface of the Boolean query builder for recruiters with the set of prioritized suggested position-detail keywords for searching people databases or search engines using the set of prioritized suggested position-detail keywords;
processing a selection or overriding of any of the prioritized suggested position-detail keywords from the user interface of the Boolean query builder for recruiters and enabling adding custom keywords that were not automatically suggested, to generate a Boolean search query for searching people databases or search engines using the selection of the any of the prioritized suggested position-detail keywords;
generating the Boolean search query based on the selection of the any of the prioritized suggested position-detail keywords that are selected from (i) companies based on (a) similar companies having the target position, (b) companies from which the persons who are currently in this position were hired from, and (c) companies that the persons usually come from to the company associated with the target position and (ii) titles based on (a) same title, (b) similar titles, (c) titles that the candidates who are currently in this position had before the users joined this job, and (d) titles that the persons who are currently in the same title had before, wherein the Boolean search query comprises:
    keywords corresponding to a first skill and a second skill separated by an OR operator combined with an AND operator with keywords corresponding to a first title and a second title separated by an OR operator, and combined with an AND operator with keywords corresponding to a first company and a second company separated by an OR operator;
automatically customizing a format of the Boolean search query for the one or more (a) people databases or (b) search engines based on the application programming interfaces (APIs) of custom engines of the people databases or search engines and syntax variations in the people databases or search engines to obtain the customized Boolean search query for searching people databases or search engines using the selection of the any of the position-detail keywords;

executing the customized Boolean search query the one or more (a) people databases or (b) search engines to obtain a list of relevant potential candidates from across the people databases or search engines;

determining areas of match and areas of mismatch between the candidate from a candidate list and the target position to generate a compatibility report; and displaying a compatibility score and the compatibility report of the candidate for the target position within a browser extension as a side-bar while browsing a profile of the candidate to enable making a quick decision on the candidate.

6. The processor implemented method of claim 5, further comprising prioritizing a set of filter properties that are shown in the Boolean query interface based on at least a frequency of occurrence of properties in the background details of the users currently in the role corresponding to the target position, wherein the filter properties comprise frequently occurring values of background details associated with the filter in the position-detail profile of the target position.

7. The processor implemented method of claim 5, further comprising assigning weights to each of the prioritized keywords; wherein the Boolean query is executed based on the prioritized set of keywords and the weights assigned to each of the prioritized keywords on the one or more (a) people databases or (b) search engines based on APIs or a query syntax of the search engines, to obtain the candidate list.

8. The processor implemented method of claim 5, further comprising the communication interface to automatically generate a draft message to the candidate, wherein the message comprises an indication (i) that the candidate is a good match for the target position, (ii) and why the candidate is a good match for the target position.

9. A system for automatically pre-populating a user interface of a Boolean query builder for recruiters to generate, customize, and execute a customized Boolean search query across people databases or search engines, the system comprising:
a device processor; and
a non-transitory computer readable storage medium comprising one or more modules executable by said device processor, wherein said processor is configured to:
automatically determine a set of suggested position-detail keywords that are suggested based on an analysis of user profiles who are currently in a role corresponding to a target position or who have previously worked at the role corresponding to the target position that are available in a database, wherein the set of position-detail keywords are selected from at least one of skills, titles, and companies of users who are currently in the role corresponding to the target position or who have previously worked at the role corresponding to the target position using a machine learning or a statistical technique;
automatically prioritize the set of suggested position-detail keywords based on at least a frequency of occurrence of the suggested position-detail keywords in at least one of skills, certifications, years-of-experience, previous positions from which the users have joined the target position, and a past educational background from which the users joined the target position, to obtain a set of prioritized suggested position-detail keywords using the machine learning or the statistical technique;
pre-populate a user interface of the Boolean query builder for recruiters with the set of prioritized suggested position-detail keywords for searching people databases or search engines using the set of prioritized suggested position-detail keywords;
process a selection or overriding of any of the prioritized suggested position-detail keywords from the user interface of the Boolean query builder for recruiters and enabling adding custom keywords that were not automatically suggested, to generate a Boolean search query for searching people databases or search engines using the selection of the any of the prioritized suggested position-detail keywords, wherein the Boolean search query excludes prioritized suggested position-detail keywords based on the selection of the any of the prioritized suggested position-detail keywords with a NOT operator;
generate the Boolean search query based on the selection of the any of the prioritized suggested position-detail keywords that are selected from (i) companies based on (a) similar companies having the target position, (b) companies from which the persons who are currently in this position were hired from, and (c) companies that the persons usually come from to the company associated with the target position and (ii) titles based on (a) same title, (b) similar titles, (c) titles that the candidates who are currently in this position had before the users joined this job, and (d) titles that the persons who are currently in the same title had before, wherein the Boolean search query comprises:
keywords corresponding to a first skill and a second skill separated by an OR operator combined with an AND operator with keywords corresponding to a first title and a second title separated by an OR operator, and combined with an AND operator with keywords corresponding to a first company and a second company separated by an OR operator;
automatically customize a format of the Boolean search query for the one or more (a) people databases or (b) search engines based on the application programming interfaces (APIs) of custom engines of the people databases or search engines and syntax variations in the people databases or search engines to obtain the customized Boolean search query for searching people databases or search engines using the selection of the any of the position-detail keywords; and
execute the customized Boolean search query on the one or more (a) people databases or (b) search engines to obtain a list of relevant potential candidates from across the people databases or search engines.

* * * * *